(12) United States Patent
Mohr et al.

(10) Patent No.: US 8,906,540 B2
(45) Date of Patent: *Dec. 9, 2014

(54) MICRO-POROUS MULTI-LAYER MEMBRANE FILM BASED ON POLYPROPYLENE FOR BATTERIES WITH A CUT-OFF FUNCTION

(75) Inventors: Thilo Mohr, Homburg (DE); Detlef Busch, Saarlouis (DE); Bertram Schmitz, Saargemunies (FR); Christian Peters, St. Ingbert (DE)

(73) Assignee: Treofan Germany GmbH & Co. KG (DE)

(*) Notice: Subject to any disclaimer, the term of this patent is extended or adjusted under 35 U.S.C. 154(b) by 873 days.
This patent is subject to a terminal disclaimer.

(21) Appl. No.: 12/990,238

(22) PCT Filed: Apr. 23, 2009

(86) PCT No.: PCT/EP2009/002961
§ 371 (c)(1),
(2), (4) Date: Nov. 23, 2010

(87) PCT Pub. No.: WO2009/132802
PCT Pub. Date: Nov. 5, 2009

(65) Prior Publication Data
US 2011/0064990 A1    Mar. 17, 2011

(30) Foreign Application Priority Data
May 2, 2008  (DE) .......... 10 2008 021 996

(51) Int. Cl.
| H01M 2/16 | (2006.01) |
| B32B 7/02 | (2006.01) |
| B29C 55/12 | (2006.01) |
| B32B 27/32 | (2006.01) |
| C08L 23/12 | (2006.01) |
| B32B 27/18 | (2006.01) |
| B29C 55/02 | (2006.01) |
| B29C 55/14 | (2006.01) |
| B29K 23/00 | (2006.01) |
| C08L 53/00 | (2006.01) |
| C08L 23/10 | (2006.01) |
| C08L 23/16 | (2006.01) |
| B29K 105/00 | (2006.01) |

(52) U.S. Cl.
CPC ............... *B29C 55/023 (2013.01); B32B 27/32 (2013.01); C08L 23/12 (2013.01); B32B 27/18 (2013.01); *B29K 2023/12* (2013.01); *B29K 2023/0641* (2013.01); *H01M 2/1653* (2013.01); *C08L 53/00* (2013.01); *C08L 2207/02* (2013.01); *C08L 23/10* (2013.01); *C08L 23/16* (2013.01); *B29K 2105/0005* (2013.01); *H01M 2/16* (2013.01); *B29C 55/143* (2013.01); *Y10S 428/91* (2013.01)
USPC ........... 429/145; 429/144; 429/129; 429/132; 428/212; 428/36.5; 428/523; 428/910; 428/317.9; 264/291; 525/88

(58) Field of Classification Search
CPC .................. H01M 2/16; H01M 2/1653; B29C 44/22–44/24; B29C 55/12; B32D 7/00

USPC ......... 429/144–145, 129, 132; 428/212, 36.5, 428/523, 910, 317.9; 264/291; 525/88
See application file for complete search history.

(56) References Cited

U.S. PATENT DOCUMENTS

| 5,231,126 | A |   | 7/1993 | Shi et al. |
| 5,594,070 | A |   | 1/1997 | Jacoby et al. |
| 5,993,954 | A | * | 11/1999 | Radovanovic et al. .... 428/315.5 |
| 6,511,755 | B1 | * | 1/2003 | Mochizuki et al. ........... 428/516 |
| 6,838,042 | B1 |   | 1/2005 | Wieners et al. |
| 7,195,818 | B2 | * | 3/2007 | Kong et al. ................... 428/349 |
| 7,235,203 | B2 | * | 6/2007 | Sadamitsu et al. ......... 264/210.7 |
| 7,915,342 | B2 | * | 3/2011 | Aguirre et al. .................. 525/88 |
| 2005/0212183 | A1 | * | 9/2005 | Busch et al. .................. 264/509 |
| 2007/0196638 | A1 | * | 8/2007 | Wei et al. ................... 428/304.4 |
| 2007/0264578 | A1 |   | 11/2007 | Ozaki et al. |
| 2009/0041965 | A1 |   | 2/2009 | Kochem et al. |

FOREIGN PATENT DOCUMENTS

| DE | 3610644 A1 | 10/1986 |
| DE | 4420989 A1 | 12/1995 |
| DE | 19949898 A1 | 5/2001 |
| EP | 0550262 A1 | 7/1993 |
| EP | 0557721 A2 | 9/1993 |
| EP | 0668156 A1 | 8/1995 |
| EP | 0967671 A2 | 12/1999 |
| EP | 1047141 A2 | 10/2000 |
| WO | WO-2006/099990 A1 | 9/2006 |
| WO | WO-2007/051103 A2 | 5/2007 |

OTHER PUBLICATIONS

U.S. Appl. No. 12/990,228, filed Oct. 29, 2010, Peters et al.
U.S. Appl. No. 12/990,232, filed Oct. 29, 2010, Peters et al.
Arora, P. and Zhang, Z., "Battery Separators," Chem. Rev. 2004, vol. 104, pp. 4419-4462.
Zheng, Q., et al., "Structure, morphology and non-isothermal crystallization behavior or polypropylene catalloys," Polymer, 2005, vol. 46, pp. 3163-3174.
Laman, F.C., et al., "Impedance Studies for Separators in Rechargeable Lithium Batteries," *J. Electrochem. Soc.*, Apr. 1993, vol. 140, No. 4, pp. L51-L53.

* cited by examiner

*Primary Examiner* — Milton I Cano
*Assistant Examiner* — Michael Dignan
(74) *Attorney, Agent, or Firm* — Drinker Biddle & Reath LLP

(57) ABSTRACT

The invention relates to a biaxially oriented microporous film composed of at least three coextruded layers encompassing an internal cut-off layer and two external layers, wherein all three layers contain a mixture of propylene homopolymer and propylene block copolymer and β-nucleation agent. The propylene block copolymer I of the external layers has a melting point exceeding 140° C. and the propylene block copolymer II of the internal layer has a melting range starting at a temperature ranging from 50 to 120° C. and the melting point of the propylene block copolymer I is greater than the melting point of the propylene block copolymer II.

17 Claims, No Drawings

MICRO-POROUS MULTI-LAYER MEMBRANE FILM BASED ON POLYPROPYLENE FOR BATTERIES WITH A CUT-OFF FUNCTION

CROSS-REFERENCE TO RELATED APPLICATIONS

This application is a national stage application (under 35 U.S.C. §371) of PCT/EP2009/002961, filed Apr. 23, 2009, which claims benefit of German application 10 2008 021 996.7, filed May 2, 2008.

BACKGROUND OF THE INVENTION

The present invention relates to a microporous film and the use thereof as a separator in batteries.

Modern devices require an energy source, such as primary or secondary batteries, which enable them to be used irrespective of their spatial context. The disadvantage of primary batteries is that they have to be disposed of. As a result, an increasing number of storage (secondary) batteries are being used, which can be charged up again and again using a main battery charger. Nickel-cadmium batteries (NiCd batteries), for instance, can achieve a service life of approximately 1000 charge cycles if used correctly.

Primary and secondary batteries always consist of two electrodes, which are immersed in an electrolyte solution, and a separator, which separates the anode from cathode. The different types of secondary battery are distinguished by the electrode material used, the electrolyte and the separator used. During charging, a current flows through the battery. The flow of current triggers an electrochemical reaction at the electrodes. Once the battery is charged, it can supply current until the chemical reaction, which is the reverse of the charging process, is exhausted.

The purpose of a battery separator is to provide a spatial division between the anode and cathode in primary batteries and the negative and positive electrode in storage batteries. The separator must be a barrier that isolates the two electrodes from one another electrically, in order to avoid short-circuits. At the same time, however, the separator must be permeable to ions, so that electro-chemical reactions can take place in the cell.

A battery separator must be thin, so that the internal resistance is as low as possible and a high packing density can be achieved. This is the only way of achieving good performance data and high capacities. In addition, it is necessary for the separators to absorb the electrolyte and guarantee ion exchange when the cells are full. Whereas such things as fabric were used previously, nowadays predominantly fine-pored materials such as non-woven fabrics and membranes are used.

Just as there are different battery systems, the separators used in them must differ too, e.g. according to the electrolyte to which they are exposed during their service life. A further criterion for the choice of separator is price. Separators that remain stable over many charge and discharge cycles are made from higher-grade materials than those used in cheaper disposable batteries.

The occurrence of short-circuits is a problem, particularly in lithium batteries. In the case of thermal loading, the battery separator may melt in lithium ion batteries, leading to a short-circuit with disastrous consequences. Similar risks exist if the lithium batteries suffer mechanical damage or are over-charged due to a defect in the charger's electronic system.

In order to increase the safety of lithium ion batteries, shut-down membranes were developed in the past. These special separators close their pores in the shortest time at a given temperature, which is significantly lower than the melting point or ignition point of lithium. The catastrophic consequences of a short-circuit in lithium batteries are thereby largely avoided.

At the same time, though, the separators also need to have a high mechanical strength, which is guaranteed by materials with high melting temperatures. Hence, for instance, polypropylene membranes are advantageous due to their good puncture resistance, but polypropylene's melting point of around 164° C. is very close to lithium's flash point (170° C.).

The prior art discloses how polypropylene membranes can be combined with further layers, which are constructed from materials with a lower melting point, such as polyethylene. Such modifications of the separators must not, of course, have a detrimental effect on the other properties, such as porosity, or provide an added impediment to ion migration. However, the inclusion of polyethylene layers has a very negative effect on the permeability and mechanical strength of the separator overall. In addition, the adhesion of the polyethylene layers to polypropylene is problematic, with the result that only selected polymers in these two classes can be coextruded.

The problem addressed by the present invention involved providing a separator for batteries which displayed a cut-off function and outstanding mechanical strength. Furthermore, the membrane should be capable of being manufactured using a simple, cost-effective method.

BRIEF SUMMARY OF THE INVENTION

The problem addressed by the invention is solved by a biaxially oriented microporous film composed of at least three coextruded layers encompassing at least one internal layer and two external layers, wherein all three layers contain a mixture of propylene homopolymer and propylene block copolymer and β-nucleation agent and wherein the propylene block copolymer I of the external layers has a melting point exceeding 140° C. and the propylene block copolymer II of the internal layer has a melting range starting at a temperature ranging from 50 to 120° C. and wherein the melting point of the propylene block copolymers I is higher than the melting point of the propylene block copolymers II.

DETAILED DESCRIPTION OF THE INVENTION

Surprisingly, the film according to the invention displays both very good mechanical strength and the desired cut-off function when used as a separator. The film's gas permeability is significantly reduced when the film is exposed to a greater temperature. For example, the Gurley value rises by at least 30% (relative to the original value), preferably by 40 to 80%, after one minute's heat treatment at 130° C. The films according to the invention generally display a Gurley value of at least 6000 secs, preferably 10,000 to 500,000 secs, particularly 15,000 to 100,000 secs, after this heat treatment (1 min @ 130° C.). Consequently, with its use according to the invention as a separator in batteries, the consequences of a short-circuit can be effectively averted. If higher temperatures occur inside the battery as a result of a short-circuit, the pores in the separator are closed by adding the special block copolymer II in the internal layer or internal layers in a short time, so that a further passage of gases or ions is prevented and the chain reaction interrupted.

All layers of the film contain as the main components a propylene homopolymer and propylene block copolymer with the melting point chosen in each case or the respective melting properties and at least one β-nucleation agent, as well as small quantities of other polyolefins if necessary, insofar as they do not have a detrimental effect on the porosity and other main properties and, if necessary, the usual additives, such as stabilisers, neutralisation agents and/or incompatible particles in the effective amounts in each case.

In general, each of the layers contains 50 to 90% by wt, preferably 50 to 80% by wt, particularly 55 to 75%, propylene homopolymer and 10-50% by wt propylene block copolymer, preferably 20 to 50% by wt, particularly 25 to 45% by wt and 0.001 to 5% by wt, preferably 50-10,000 ppm of at least one β-nucleation agent, relative to the weight of the layer concerned. In the event that further polyolefins should be contained in the layer or layers, the proportion of the propylene homopolymer is reduced accordingly. In general, the quantity of additional polymers amounts of 0 to <30% by wt, preferably 0 to 20% by wt, particularly 0.5 to 5% by wt, if these are also contained. In the same way, it is also true that the aforementioned proportion of propylene homopolymer is reduced when higher quantities of up to 5% by wt nucleation agent are used. The proportions of the individual components may be identical or different in all layers and chosen independently of one another in principle.

Suitable propylene homopolymers contain 98 to 100% by wt, preferably 99 to 100% by wt propylene units and have a melting point (DSC) of 150° C. or higher, preferably 150 to 170° C., and in general a melt flow index of 0.5 to 10 g/10 min, preferably 2 to 8 g/10 min, at 230° C. and a force of 2.16 kg (DIN 53735). Isotactic propylene homopolymers with an n-heptane-soluble proportion of less than 15% by wt, preferably 1 to 10% by wt, are preferred propylene homopolymers for the layer. Advantageously, isotactic propylene homopolymers with a high chain isotacticity of at least 96%, preferably 97-99% ($^{13}$C-NMR; triad method), are used. These raw materials are known as HIPP (high isotactic polypropylene) or HCPP (high-crystalline polypropylene) polymers in the state of the art and are characterised by a high stereoregularity of the polymer chains, higher crystallinity and a higher melting point, compared with propylene polymers with a $^{13}$C-NMR isotacticity of under 96%, preferably 92 to 95%, which can also be used ($^{13}$C-NMR; triad method).

The propylene block copolymers used in each layer contain predominantly, i.e. over 50% by wt, preferably 70 to 99% by wt, particularly 90 to 99% by wt, propylene units. Suitable comonomers in corresponding amounts, for example, <50% by wt; 1 to 30% by wt; 1 to 10% by wt, are ethylene, butylene units or higher alkene homologues, among which ethylene units are preferred.

The film according to the invention is characterised in that at least one internal layer contains a special block copolymer II, which is different from the block copolymers I of the external layer. This block copolymer II displays a different melting behaviour to the block copolymers I in the outside layers. The internal layer or internal layers with the block copolymers II cause the pores to close at higher temperatures, so that the permeability of the microporous film is significantly reduced. This internal layer or internal layers are therefore also referred to as the cut-off layer. In contrast, the other layers containing the block polymer I do not have this cut-off function.

It is fundamental to the invention that the melting point of the block copolymer I of the external layers is higher than the melting point of the block copolymer II of the internal layer. The melting point of the block copolymer II of the internal layer is generally lower than 150° C., preferably ranging from 100 to 145° C. Block copolymers with a higher melting point of over 150° C. in the internal layer do not generally lead to a closure of the pores at temperatures below the flashpoint of lithium in the desired way, particularly not quickly enough.

In addition, it is essential for the block copolymer II to begin to melt at comparatively low temperatures, i.e. the melting range according to DSC starts at a temperature ranging from 50 to 120° C., preferably 50 to 110° C., the melting range particularly begins at 55 to 100° C. This means that the start of the melting range is a given temperature that lies within the aforementioned temperature ranges and characterises the start of the melting process.

Surprisingly, the addition of what is in this context a low-melting block copolymer II does not adversely affect the film in the expected manner. The films nevertheless display good mechanical strength. A higher comonomer content, preferably ethylene content, is preferred for the block copolymers II and generally lies between 10 and 50% by wt, preferably 10 and 25% by wt. The melt flow index of the block copolymers II generally ranges from 0.1 to 10 g/10 min, preferably 0.3 to 5 g/10 min.

Furthermore, it is essential for the block copolymer I of the external layers to have a melting point exceeding 140 to 170° C., preferably from 150 to 165° C., particularly 150 to 160° C. The melting range of these block copolymers I generally begins at over 120°, preferably in the range 125-140° C. For block copolymers I, a low comonomer content, preferably ethylene content, is preferred and usually lies between 1 and 20% by wt, preferably 1 and 10% by wt. Block copolymer I usually contains less comonomer, preferably ethylene, than block copolymer II. The melt flow index of block copolymer I usually ranges from 1 to 20 g/10 min, preferably 1 to 10 g/10 min.

The "melting point" and "start of the melting range" parameters are determined by means of DSC measurement and calculated from the DSC curve, as described in the measuring methods.

If necessary, each layer of film (internal and external layers) may also contain other polyolefins in addition to the propylene homopolymer and propylene block copolymer. The proportion of these other polyolefins is usually less than 30% by wt, preferably ranging from 1 to 10% by wt. Other polyolefins are, for example, static copolymers of ethylene and propylene with an ethylene content of 20% by wt or less, statistical copolymers of propylene with $C_4$-$C_8$ olefins with an olefin content of 20% by wt or less, terpolymers of propylene, ethylene and butylene with an ethylene content of 10% by wt or less and with a butylene content of 15% by wt or less, or polyethylene, such as HDPE, LDPE, VLDPE, MDPE and LLDPE.

All known additives are suitable in principle for use as β-nucleation agents for the microporous layers, said additives promoting the formation of β-crystals of the polypropylene when a polypropylene melt cools down. Such β-nucleation agents, and also their mode of action in a polypropylene matrix, are known per se in the state of the art and are described in detail below.

Various crystalline phases of polypropylene are known in the art. While a melt cools down, it is predominantly the α-crystalline PP that forms, the melting point of which is around 158-162° C. By means of a particular temperature control, a small proportion of β-crystalline phase can be produced during cooling, which has a significantly lower melting point of 148-150° C. compared with the monoclinic α-modification. Additives that produce a greater proportion of the β-modification during cooling of the polypropylene are known in the state of the art, for example γ-quinacridone, dihydroquinacridine or calcium salts of phthalate acid.

For the purposes of the present invention, highly active β-nucleation agents are preferably used, which produce a β-proportion of 40-95%, preferably 50-85% (DSC), during cooling of the melt film. An example of what is suitable for this is a dual-component nucleation system made of calcium carbonate and organic dicarbonic acids, which is described in DE 3610644, to which specific reference is made here. Particularly advantageous are calcium acids of the dicarbonic acids, such as calcium pimelate or calcium suberate, as described in DE 4420989, to which specific reference is likewise made. The dicarboxamides described in EP-0557721, particularly N,N-dicyclohexyl-2,6-naphthalene dicarboxamides, are suitable β-nucleation agents.

In addition to the nucleation agents, compliance with a particular temperature range and dwell times at these temperatures during cooling of the melt film is important for achieving a high proportion of β-crystalline polypropylene. Cooling of the melt film preferably takes place at a temperature of 60 to 130° C., particularly 80 to 120° C. A slow cool-down likewise promotes growth of β-crystallites, consequently, the draw-off speed, i.e. the speed at which the melt film runs over the first cooling roll should be slow, so that the necessary dwell times at the chosen temperatures are sufficiently long. The take-off speed is preferably less than 25 m/min, particularly 1 to 20 m/min.

Particularly preferred embodiments of the microporous film according to the invention contain 50 to 10,000 ppm, preferably 50 to 5000 ppm, particularly 50 to 2000 ppm, calcium pimelate or calcium suberate in the respective layer.

The microporous membrane film is multi-layered and includes at least one internal layer with a cut-off function and external covering layers on both sides with the composition described earlier, which have no such cut-off functions. The membrane film 3 preferably comprises layers, wherein the cut-off layer forms the central internal layer (base layer) of the film with external covering layers on both sides. In a further embodiment, the film may comprise four or five layers, wherein at least one internal layer, i.e. the central base layer and/or an intermediate layer and/or both intermediate layers can form the layer or layers with the cut-off function. Additional internal layers without a cut-off function in these 4 and 5-layered embodiments are composed in the same way as the covering layers described earlier. Four and five-layered embodiments of this sort always have the two previously described external covering layers of propylene homopolymer, propylene block copolymer I and β-nucleation agent. At least one internal cut-off layer differs from these external layers and is made from propylene homopolymer, propylene block copolymer II and β-nucleation agent.

The thickness of the membrane film usually ranges from 15 to 100 μm, preferably 20 to 80 μm. The internal cut-off layer generally has as the base layer a thickness of 3 to 30 μm, preferably 5 to 20 μm, particularly 7 to 15 μm. The thicknesses of the external covering layers may vary over a broad range, in order to adjust the desired total thickness of the membrane film. The thickness of the covering layer in each case is therefore generally 0.5 to 30 μm, preferably 1 to 25 μm. Intermediate layers with a cut-off function range from 3 to 15 μm, preferably 5 to 10 μm. Other intermediate layers, i.e. without a cut-off function, may likewise also be thinner or thicker.

The microporous film may receive corona, flame or plasma treatment, in order to improve the electrolyte filling. The density of the microporous membrane film usually ranges from 0.2 to 0.6 g/cm$^3$, preferably 0.3 to 0.5 g/cm$^3$. For the film to be used as a separator in batteries, it should have a Gurley value of 100 to 5000 secs, preferably 500 to 2500 secs. Of course this is the film's Gurley value before heat treatment. The film's bubble point should not exceed 350 nm, preferably 50 to 300 nm, and the average pore diameter should range from 50 to 100 nm, preferably 60 to 80 nm.

In the context of the present invention, the term "cut-off function" is taken to mean reduced gas permeability under the influence of a higher temperature. The film according to the invention displays this cut-off function due to the internal cut-off layer. The film's Gurley value is increased by at least 30%, preferably by 40-80%, compared with the original value, if the film is exposed to a temperature of 130° C. for one minute. The films according to the invention generally display a Gurley value of at least 600 secs, preferably 10,000 to 500,000 secs, particularly 15,000 to 100,000 secs, after this heat treatment (1 min @ 130° C.). The value is determined in principle using the method described for establishing gas permeability, in which this measurement is taken before and after the film has been subjected to a temperature load.

The porous film according to the invention is preferably produced according to the coextrusion process known per se.

The procedure followed in the context of this process is such that the mixtures of propylene homopolymer, propylene block copolymer I or II and β nucleation agent in the respective layers are melted in extruders and coextruded through a flat-film extrusion die onto a draw-off roller, on which the multi-layered melt film solidifies and cools, forming β-crystallites. The cooling temperatures and cooling times are chosen in such a way that the highest possible proportion of β-crystalline polypropylene is produced in the precursor film. This precursor film with a high proportion of β-crystalline polypropylene is then stretched biaxially in such a way that the β-crystallites are converted into α-polypropylene during stretching. The biaxially stretched film is then thermofixed and if necessary corona-, plasma- or flame-treated on one surface.

The biaxial stretching (orientation) is generally carried out in sequence, wherein the stretching is preferably longitudinal (in the machine direction) to begin with and then transverse (perpendicular to the machine direction).

The draw-off roller or draw-off rollers are kept at a temperature of 60 to 130° C., preferably 90 to 120° C., to promote the formation of a high proportion of β-crystalline polypropylene.

During stretching in the longitudinal direction, the temperature is less than 140° C., preferably 80 to 120° C. The longitudinal stretch ratio ranges from 2.0:1 to 5:1. Stretching in a transverse direction takes place at a temperature of under 140° C. and should be chosen so that the transverse stretching temperature lies below the melting point of the propylene block copolymer II in the internal layer. The transverse stretch ratio lies in the range 2.5:1 to 7.5:1.

Longitudinal stretching is advantageously carried out with the help of two different fast-running rollers corresponding to the desired stretch ratio and transverse stretching with the help of a corresponding clip frame.

The biaxial stretching of the film is generally followed by its thermofixing (heat treatment), wherein the film is kept at a temperature of 110 to 130° C. for roughly 0.5 to 10 secs. The film is then rolled up in the customary fashion using a roll-up mechanism.

As mentioned above, if necessary a surface of the film is corona-, plasma- or flame-treated according to one of the known methods after biaxial stretching.

The following measuring methods were used to characterise the raw materials and films.

Melt Flow Index

The melt flow index of the propylene polymers and propylene-block copolymer was measured according to DIN 53 735 at a load of 2.16 kg and 230° C. and at 190° C. and 2.16 kg for polyethylene.

Melting Points and Start of the Melting Range

Part-crystalline thermoplastic polymers such as propylene polymers, for example, do not have a set melting point, on account of the different crystalline ranges or phases. Instead, they have a melting range. The melting point and melting range are therefore values that are derived from a DSC curve for the respective polymer in a precisely defined manner. In the case of the DSC measurement, a quantity of heat per unit of time is supplied to the polymer with a defined heating rate and the flow of heat is plotted against the temperature, i.e. the change in enthalpy measured as the deviating course of the heat flow from the base line. The base line is understood to mean the (linear) part of the curve in which no phase conversions take place. In this case, a linear correlation applies between the amount of heat supplied and the temperature. In the range in which melting processes take place, the heat flow increases by the necessary melting energy and the DSC curve rises. In the area in which most crystallites melt, the curve reaches a maximum and falls back down to the base line once all the crystallites have melted. The melting point is the highest point of the DSC curve, within the meaning of the present invention. In the context of the present invention, the start of the melting range is that temperature at which the DSC curve deviates from the base line and the DSC curve starts to rise.

To determine the melting point and the start of the melting range, the DSC curve is plotted with a heating and cooling speed of 10 K/1 min in the 20 to 200° C. range. To determine the melting point and melting range of the polymers, the second heating curve is evaluated as usual.

β-Content of the Precursor Film

The β-content of the precursor film is likewise determined by a DSC measurement, which is performed on the precursor film in the following way. The precursor film is heated to 220° C. in the DSC, initially at a heating rate of 10 K/min, and melted and cooled again. The crystallinity degree $K_{\beta,DSC}$ is determined as a ratio of the melt enthalpies of the β-crystalline phase ($H_\beta$) to the total melt enthalpies of the β- and α-crystalline phase ($H_\beta + H_\alpha$).

Density

The density is determined according to DIN 53 479, method A.

Permeability (Gurley Value)

The permeability of the films was measured using the Gurley tester 4110 according to ASTM D 726-58. This involves determining the time (in secs) needed for 100 cm$^3$ air to permeate the 1 inch$^2$ (6,452 cm$^2$) label surface. The pressure difference across the film in this case corresponds to the pressure of a 12.4 cm high water column. The time required then corresponds to the Gurley value.

Cut-off Function

The cut-off function is determined by Gurley measurements before and after heat treatment at a temperature of 130° C. The film's Gurley value is measured as described earlier. The film is then exposed to a temperature of 130° C. in the heating furnace for one minute. The Gurley value is subsequently determined again as described. The cut-off function comes into effect when, following heat treatment, the film displays a Gurley value that is at least 30% higher and/or when the Gurley value is at least 6000 secs following the heat treatment.

The invention is now explained by the following examples.

Example 1

Following the coextrusion method, a three-layered precursor film was extruded from a flat-film extrusion die at an extrusion temperature of 240 to 250° C. This precursor film was first drawn on a cooling roller and cooled. The precursor film was then oriented in a longitudinal and transverse direction and finally fixed. The three-layer film had a layer structure comprising a first covering layer/internal base layer/second covering layer. The individual layers of the film had the following composition:

Internal base layer B with a thickness of 20 μm (cut-off layer):

Approx. 75% by wt highly isotactic propylene homopolymerisate (PP) with a $^{13}$C-NMR isotacticity of 97% and an n-heptane-soluble proportion of 2.5% by wt (relative to 100% PP) and a melting point of 165° C.; and a melt flow index of 2.5 g/10 min at 230° C. and a load of 2.16 kg (DIN 53 735) and approx. 25% by wt propylene-ethylene-block copolymerisate II with an ethylene share of 18% by wt relative to the block copolymer and an MFI (230° C. and 2.16 kg) of 0.8 g/10 min and a melting point of 144° C., the melting range starts at 70° C. (DSC)

0.1% by wt Ca-pimelate as the β-nucleation agent

External layers each with a thickness of 15 μm (first and second covering layer) Approx. 75% by wt highly isotactic propylene homopolymerisate (PP) with a $^{13}$C-NMR isotacticity of 97% and an n-heptane-soluble proportion of 2.5% by wt (relative to 100% PP) and a melting point of 165° C. and a melt flow index of 2.5 g/10 min at 230° C. and a load of 2.16 kg (DIN 53 735) and approx. 25% by wt propylene-ethylene-block copolymerisate I with an MFI (230° C. and 2.16 kg) of 5 g/10 min and a melting point (DSC) of 164° C., the melting range starts at 130° C. (DSC)

0.1% by wt Ca-Pimelate as the β-Nucleation Agent

The film also contains the customary amounts of stabiliser and neutralisation agent in each layer.

The melted polymer mixture was drawn over a first draw-off roller and a further trio of rollers and solidified, after which it was stretched longitudinally, transversely and fixed, wherein the following conditions were selected in particular:

Extrusion:
Extrusion temperature 245° C.
Draw-off roller:
Temperature 120° C., dwell time 55 secs
Longitudinal stretching:
Stretch roll T=90° C.
Longitudinal stretching by a
Factor of 4
Transverse stretching:
Heating fields T=130° C.
Stretching fields:
T=130° C.
Transverse stretching by a
Factor of 4

The porous film produced in this way was approx. 50 μm thick and displayed a density of 0.43 g/cm$^3$ and had a uniform white-opaque appearance. The Gurley value was 3000 secs. Following the furnace heat treatment at 130° C. for 1 min, the Gurley value was >10000 secs.

Example 2

A film was produced as described in Example 1. Unlike Example 1, 45% by wt of the propylene block copolymers II were now used in the internal layer. The proportion of the propylene homopolymer was reduced accordingly to 55% by wt. The composition of the remaining layers, as well as the layer thicknesses and process parameters, was left unchanged. The porous film produced in this way was approx. 50 µm thick and had a density of 0.46 g/cm³ and a uniform white opaque appearance. The Gurley value was 4500 secs. Following the furnace heat treatment at 130° C. for 1 min, the Gurley value was >10000 secs.

Example 3

A film was produced as described in Example 1. Unlike Example 1, 40% by wt of the propylene block copolymer I and approx. 60% by wt of the propylene homopolymer were now used in the two covering layers. The thickness of the base layer was reduced to 15 µm and the thickness of the two covering layers was reduced to 10 µm in each case. The composition of the internal base layer and the process parameters were left unchanged. The porous film produced in this way was approx. 35 µm thick, had a density of 0.42 g/cm³ and a uniform white opaque appearance. The Gurley value was 3500 secs. Following the furnace heat treatment at 130° C. for 1 min, the Gurley value was >10000 secs.

Example 4

A five-layered film was produced as described in Example 1. Unlike Example 1, the film had additional intermediate layers with the following composition on both sides between the covering layers and the base layer:

approx. 60% by wt highly isotactic propylene homopolymerisate (PP) with a $^{13}$C-NMR isotacticity of 97% and an n-heptane-soluble proportion of 2.5% by wt (relative to 100% PP) and a melting point of 165° C. and a melt flow index of 2.5 g/10 min at 230° C. and a load of 2.16 kg (DIN 53 735) and approx. 40% by wt propylene-ethylene-block copolymerisate I with an MFI (230° C. and 2.16 kg) of 5 g/10 min and a melting point (DSC) of 164° C., the melting range starts at 130° C. (DSC)
and also 0.1% by wt Ca-pimelate as the β-nucleation agent.

The composition of the internal base layer and the process parameters remained unchanged.

The porous film produced in this way was approx. 50 µm thick, had a density of 0.40 g/cm³ and a uniform white-opaque appearance. The thickness of the base layer was 20 µm, the thickness of the intermediate layers was 10 µm each and the thickness of the covering layers was 5 µm each. The Gurley value was 2400 secs. After the furnace heat treatment at 130° C. for 1 min, the Gurley value was >10000 secs.

Comparative Example

A film was produced as described in Example 1. Unlike Example 1, the internal base layer now had the following composition:
Internal layer B (=base layer):
approx. 75% by wt highly isotactic propylene homopolymerisate (PP) with a $^{13}$C-NMR isotacticity of 97% and an n-heptane-soluble proportion of 2.5% by wt (relative to 100% PP) and a melting point of 165° C. and a melt flow index of 2.5 g/10 min at 230° C. and a load of 2.16 kg (DIN 53 735) and approx. 25% by wt propylene-ethylene-block copolymerisate I with an ethylene proportion of approx. 5% by wt relative to the block copolymer and an MFI (230° C. and 2.16 kg) of 6 g/10 min and a melting point of 150° C. (DSC)
0.1% by wt Ca-pimelate as the β-nucleation agent.

The composition of the two covering layers, as well as the layer thicknesses and the process parameters was not changed. The porous film produced in this way was approx. 50 µm thick and had a density of 0.40 g/cm³ and a uniform white opaque appearance. The Gurley value was 500 secs. Following the furnace heat treatment at 130° C. for 1 min the Gurley value was 550 secs.

The Gurley values before and after the heat treatment and also the mechanical strengths of the films (before the heat treatment) are summarised in the table below:

Evidence of a cut-off effect was produced when a Gurley value of 10,000 secs was reached. The measurement was therefore discontinued after 10,000 secs and shows that the actual Gurley value is above 10,000 secs.

TABLE

| Example | Gurley value secs. | Gurley value secs. after heat treatment | E-module in MD/TD N/mm² |
|---|---|---|---|
| VB | 500 | 550 | 820/1780 |
| 1 | 3000 | >10000 | 800/1750 |
| 2 | 4500 | >10000 | 780/1740 |
| 3 | 3500 | >10000 | 790/1740 |
| 4 | 2400 | >10000 | 810/1770 |

The invention claimed is:

1. A biaxially oriented microporous film composed of at least three coextruded layers encompassing an internal cut-off layer and two external layers, wherein all three layers contain a mixture of propylene homopolymer and propylene block copolymer and β-nucleation agent, wherein the propylene block copolymer I of the external layers has a melting point exceeding 140° C. and the propylene block copolymer II of the internal layer has a melting range starting at a temperature ranging from 50 to 120° C. and the melting point of the propylene block copolymer I is greater/higher than the melting point of the propylene block copolymer II and the block copolymer II of the internal layer having a conomonomer content of from 10 to 25% by weight, and the block copolymer I of the external layer has a melting range that starts at a temperature of over 120° C.

2. The film according to claim 1, wherein the block copolymer II has a melting point below 150° C. and the melting range starts at a temperature ranging from 50 to 110° C.

3. The film according to claim 1, wherein the block copolymer II has an ethylene or butylene content of 10 to 25% by wt and a melt flow index of 0.1 to 10 g/10 min (at 2.16 kg and 230° C.).

4. The film according to claim 1, wherein the block copolymer I has a melting point of 150 to 170° C.

5. The film according to claim 1, wherein the block copolymer I has an ethylene or butylene content of 1 to 20% by wt and a melt flow index of 1 to 20 g/10 min (at 2.16 kg and 230° C.).

6. The film according to claim 1, wherein the external layers each contain 50 to 80% by wt propylene homopolymer, 20 to 50% by wt block copolymer 1 and 50 to 10,000 ppm β-nucleation agent and the internal layer contains 50 to 80% by wt propylene homopolymer, 20 to 50% by wt block copolymer II and 50 to 10,000 ppm β-nucleation agent.

7. The film according to claim 1, wherein the propylene homopolymer is a high isotactic polypropylene with a chain isotacticity ($^{13}$C-NMR) of 95 to 98%.

8. The film according to claim 1, wherein nucleation agent is a calcium salt of pimelic acid or of suberic acid or a carboxamide.

9. The film according to claim 1, wherein the density of the film ranges from 0.2 to 0.6 g/cm$^3$.

10. The film according to claim 1, wherein the film has a Gurley value of 100 to 5000 secs/100 cm$^3$.

11. The film according to claim 1, wherein after a one minute heat treatment at a temperature of 130° C. the film has a Gurley value that is at least 30% higher than the film's Gurley value before the heat treatment.

12. The film according to claim 1, wherein the film is three-layered and is made up of the internal layer and the two covering layers.

13. The film according to claim 1, wherein the film is four or five-layered and the cut-off layer is the film's base layer and the intermediate layer(s) is/are made from polypropylene homopolymer and propylene block copolymer I and β-nucleation agent.

14. The film according to claim 1, wherein the film is four or five-layered and one or both intermediate layers form the cut-off layer and the base layer is made from polypropylene homopolymer and propylene block copolymer I and β-nucleation agent.

15. The film according to claim 1, wherein the cut-off layer has a thickness of 3 to 30 μm.

16. The film according to claim 1, wherein the film has a thickness of 15 to 100 μm.

17. A separator in a primary or a secondary battery which comprises the film according to claim 1.

* * * * *